United States Patent [19]

Pemawansa

[11] Patent Number: 5,279,739
[45] Date of Patent: Jan. 18, 1994

[54] DURABLE FILTRATION MEMBRANE HAVING OPTIMIZED MOLECULAR WEIGHT

[75] Inventor: K. P. Pemawansa, Bradford, Mass.

[73] Assignee: Koch Membrane Systems, Inc., Wilmington, Mass.

[21] Appl. No.: 746,696

[22] Filed: Aug. 19, 1991

[51] Int. Cl.$^5$ .............................................. B01D 39/00
[52] U.S. Cl. ...................... 210/500.41; 210/500.1; 210/500.27; 210/490; 428/304.4
[58] Field of Search ............... 210/500.41, 500.21, 210/500.27, 500.1, 500.28, 490; 428/304.4; 264/41, 45.1

[56] References Cited

U.S. PATENT DOCUMENTS

| | | | |
|---|---|---|---|
| 4,690,766 | 9/1987 | Linder et al. | 210/500.41 |
| 4,720,343 | 1/1988 | Walch et al. | 210/500.28 |
| 4,814,082 | 3/1989 | Wrasidlo | 210/500.41 |
| 4,867,881 | 9/1989 | Kinzer | 210/500.41 |
| 4,906,375 | 3/1990 | Heilmann | 210/500.27 |
| 5,009,824 | 4/1991 | Walch et al. | 210/500.41 |

FOREIGN PATENT DOCUMENTS

| | | | |
|---|---|---|---|
| 058042 | 4/1984 | Japan | 210/500.41 |
| 38205 | 2/1987 | Japan | 210/500.41 |
| 141610 | 6/1988 | Japan | 210/500.41 |

OTHER PUBLICATIONS

Miyano, T., et al., "Effect of Polymer Molecular Weight, Solvent and Casting Solution Composition on the Pore Size and the Pore Size Distribution of Polyethersulfone (Victrex) Membrane", *Chem. Eng. Comm.*, 1990, vol. 95, pp. 11-26.

*Primary Examiner*—Robert A. Dawson
*Assistant Examiner*—Ana M. Fortuna
*Attorney, Agent, or Firm*—Shook, Hardy & Bacon

[57] ABSTRACT

The subject of this invention is a novel polymeric composition useful in membrane technology such as microfiltration, nanofiltration, ultrafiltration, reverse osmosis and gas separation. The composition is formed by taking a known condensation polymer such as polyether sulfone, polysulfone or a polyarylether sulfone and modifying it to change the molecular weight distribution. The useful polymers of the invention will have an unmodified number average molecular weight of about 63,000 or less and weight fraction of molecules with a molecular weight of 50,000 or less in the range of 30 to 35%. Utilizing fractional precipitation or other known techniques for concentrating a high molecular weight fraction of a polymer the polymers are modified to have a number average molecular weight of a least 59,000 or a weight fraction of molecules with a molecular weight of 50,000 or less of not more than 19%. Superior resistance to cracking and other forms of membrane degradation results from using the polymer compositions of the present invention in filtration applications.

11 Claims, No Drawings

DURABLE FILTRATION MEMBRANE HAVING OPTIMIZED MOLECULAR WEIGHT

BACKGROUND OF THE INVENTION

This invention relates generally to semipermeable membranes and, more particularly, to a membrane made from a condensation polymer which has a molecular weight distribution that provides for enhanced physical properties and is particularly suited for use as an ultrafiltration membrane.

The term "ultrafiltration" as used in this application is intended to encompass microfiltration, nanofiltration, ultrafiltration, reverse osmosis and gas separation. Ultrafiltration may be performed using a variety of physical layouts which are well known to those skilled in the art and include both spiral wound and tubular modules.

Many applications of ultrafiltration technology involve food processing where sanitary conditions must be maintained at all times. This necessitates periodic cleaning with relatively harsh chemicals such as (by way of example only) chlorine containing compounds, other oxidizing agents, acids, alkalies and surfactants. These chemicals tend to degrade the membrane material and the ability of the membrane to withstand these chemicals is, in many cases, the determining factor in the useful life of the membrane.

Known materials for use in forming ultrafiltration membranes include many commercially available polymers such as polyether sulfone, polysulfone, polyarylether sulfones, polyvinylidene fluoride, polyvinyl chloride, polyketones, polyether ketones, polytetrafluoro ethylene, polypropylene and polyamides. The foregoing polymers differ widely in their physical properties and the particular material selected is based upon the properties necessary to support a particular use. While the higher molecular weight "chain" polymers such as polyvinyl chloride and polytetrafluoro ethylene exhibit superior resistance to degradation from cleaning chemicals, they also have undesirable attributes which eliminate them from consideration as membrane materials for certain applications. On the other hand, the lower molecular weight "condensation" polymers which exhibit certain desirable properties particularly suited for ultrafiltration applications are not as durable and have a short and unpredictable service life when exposed to the types of chemicals aforementioned.

SUMMARY OF THE PRESENT INVENTION

The present invention comprises an ultrafiltration membrane which is formed from a condensation polymer that has been modified to have a molecular weight distribution that is higher than would otherwise be the case or alternatively has a relatively low percentage of low molecular weight fraction present in the polymer or, preferably, both of these traits. Known additives for imparting desired physical properties to the membrane can be incorporated into the formulation.

OBJECTS OF THE INVENTION

It is therefore an object of the present invention to provide an ultrafiltration membrane which is formed from a condensation polymer and thus has the desired properties of such a polymer but which has been modified to provide an altered molecular weight distribution and as a result thereof has improved physical properties.

As a corollary to the foregoing object, an aim of this invention is to provide an ultrafiltration membrane particularly suited for use in food processing equipment which has improved resistance to degradation from cleaning compositions used in such applications.

One of the other aims of my invention is to provide an improved ultrafiltration membrane having superior resistance to chemical degradation which also exhibits the desired physical properties of membranes heretofore formed from condensation polymers of the type well known to those skilled in the art.

One of the important objectives of this invention is to provide an ultrafiltration membrane having a longer and more predictable service life when used in food processing equipment and other applications where harsh chemicals are employed to clean the equipment than has been possible with membranes known in the prior art.

Still another object of the invention is to provide an improved ultrafiltration membrane which is compatible with existing membrane additives used to impart desired properties to the membrane such as hydrophilicity and uniform pore size.

It is also an important object of this invention to provide an ultrafiltration membrane which exhibits superior resistance to degradation by harsh cleaning chemicals and also has a more uniform pore size distribution than prior constructions, thus improving performance of the membrane.

As a corollary to the object next above set forth, an aim of the invention is to provide an ultrafiltration membrane having improved filtration efficiency in comparison to other membranes typically employed in the food processing and similar industries.

Other objects of the invention will be made clear or become apparent from the following specification and claims.

DETAILED DESCRIPTION OF THE INVENTION

Synthetic polymers of the type useful in the present invention are those formed from the condensation of one or more different monomers. The polymers thus formed typically have different weight distributions among the polymer chains because of varying quantities of the molecules which make up the chains. Condensation polymers particularly suited for forming ultrafiltration membranes have relatively low number average molecular weights (e.g. within the range of about 25,000 to about 63,000) in comparison to chain polymers, i.e. those made by chain polymerization of reactive monomers (typical molecular weights for these polymers are from about 100,000 to about 1,000,000).

For purposes of the present specification and claims, number average molecular weight (MN) is defined as follows:

$$MN = \frac{(M_1 \times N_1) + (M_2 \times N_2) + (M_3 \times N_3) + \ldots + (M_r \times N_r)}{N_1 + N_2 + N_3 + \ldots + N_r}$$

Weight average molecular weight (MW) is defined as follows:

$$MW =$$

-continued
$$\frac{(M_1^2 \times N_1) + (M_2^2 \times N_2) + (M_2^2 \times N_2) + \ldots + (M_r^2 \times N_r)}{(M_1 \times N_1) + (M_2 \times N_2) + (M_3 \times N_3) + \ldots + (M_r \times N_r)}$$

Where $N_i$ is the number of molecules having molecular weight of $M_i$ ($i = 1, 2, 3, \ldots r$), where r is an integer.

A typical condensation polymer of the type useful in the present invention will have an unmodified number average molecular weight (MN) of about 63,000 or less and a weight average molecular weight (MW) of from about 100,000 to about 160,000. The weight fraction (WF) of molecules with a molecular weight of less than 50,000 will typically be around 30% to 35% (although some known polymers of the prior art which are useful in membrane formation have WFs as low as just under 16% or MNs slightly above 62,000 these are generally not preferred for the present invention).

Suitable condensation polymers include polyether sulfone, polysulfone and polyarylether sulfones. Polyether sulfone is represented by the formula:

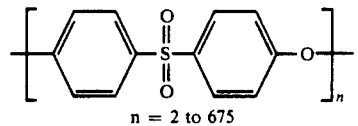

n = 2 to 675

Polyether sulfones which are useful as starting materials for the present invention will have MNs in the range of approximately 39,000 to 50,900 and WFs in the range of 22 to 34%.

Polysulfones useful in the present invention are represented by the formula:

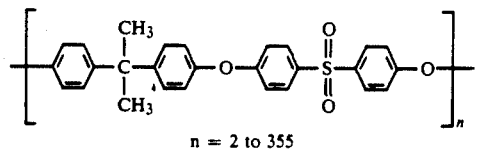

n = 2 to 355

Suitable polysulfones for carrying out the present invention will have an MN of 43,000 to 54,000 and a WF = 19.8 to 23%.

Polyarylether sulfones are represented by the formulas:

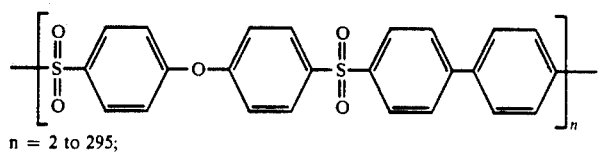

n = 2 to 295;

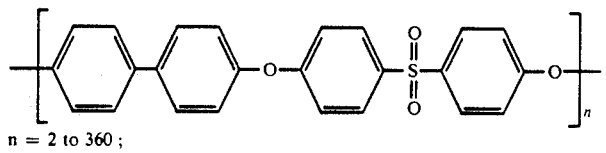

n = 2 to 360 ;

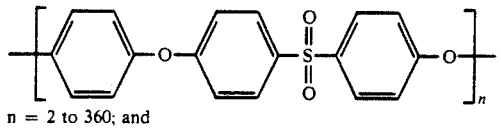

n = 2 to 360; and

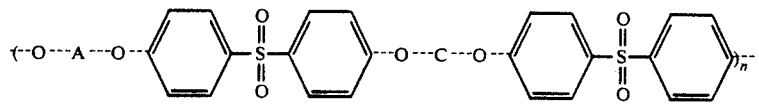

where
A = 1,4-phenylene or 4,4'-biphenylene,
C = 1,4-phenylene or 4,4'-biphenylene, and
n = 2 to 300.

The polyarylether sulfones will generally have an MN = 50,800 to 62,500 and a WF = 17 to 21.25%. Suitable polyarylether sulfones include poly(oxy-1,4-phenylene sulfonyl-1,4-phenyleneoxy-4,4'-biphenylene) and poly(oxy-1,4-phenylene sulfonyl-1,4-phenyleneoxy-4,4'-biphenyleneoxy-1,4-phenylene sulfonyl-1,4-phenyleneoxy-1,4-phenylene) having the following respective formulas:

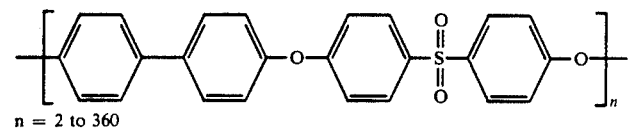

n = 2 to 360
MN = 50,000 to 50,800
WF = 19.1 to 21.25; and

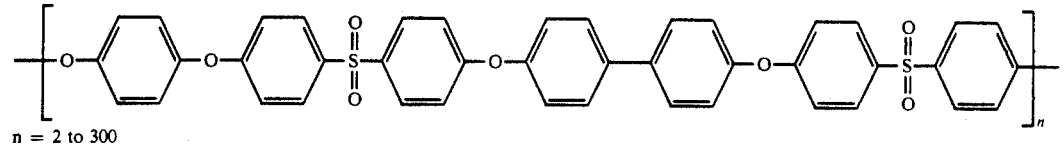

n = 2 to 300

MN = 50,000 to 50,800
WF = 19.1 to 21.25.

It has been discovered that when these condensation polymers are modified to have a number average molecular weight of about 59,000 or greater or a weight fraction of molecules with a molecular weight of not more than 50,000 which is no more than about 19% of the total of all molecules in the polymer, or both such properties, greatly superior properties for an ultrafiltration membrane formed from such polymers result.

The preferred method of modifying the molecular weight distribution of the polymer is through fractional precipitation although other known techniques for concentrating a high molecular weight fraction of a polymer, such as membrane separation and size exclusion chromatography may be utilized.

The following examples illustrate the principle of modifying the molecular weight distribution of a condensation polymer to impart the desired properties discussed above.

EXAMPLE 1

300g. of a polyether sulfone polymer [MN=39,100; MW=156,000 and WF 33.96% (as determined by gel permeation chromatography)] was dissolved in 1.2 liters of N-methyl pyrrolidone (NMP) and then mixed in a blender. 1.9 l of 80% (v/v) of NMP in water was then added. 190 ml of 50% (v/v) NMP in water was then added to precipitate the high molecular weight fraction of the polymer. The precipitate was collected as a gel. This gel was redissolved in 0.75 liters of NMP and a high molecular weight fraction was again precipitated by adding 400 ml of 60% (v/v) solution of NMP in water. The precipitated gel was then redissolved in 750 ml of NMP solvent and a third high molecular weight fraction was precipitated by adding 400 ml of the 60% (v/v) solution of NMP. Again, the gel was separated and redissolved in the 0.75 liters of NMP solvent and then reprecipitated a final time by adding 400 ml of the 60% NMP in water solution. This precipitate was dissolved in 750 ml of NMP and gelled by adding dropwise to water.

The modified polymer prepared as described above was washed several times with water and then dried for 24 hours at 150 degrees Celsius. The modified polymer had a molecular weight of 183,000 (as determined by gel permeation chromatography (GPC)), its MN=91,700 (as determined using GPC) and a WF=10.53 % (as measured by GPC).

The modified polymer was blended with 5% (w/w) of polyvinylpyrrolidone (PVP) in NMP. The PVP was present in two parts of approximately equal quantity, the first having a MN of 150,000 and a molecular weight (MW) of 612,000 and a second having an MN of 271,000 and an MW of 906,000. The PVP additive improves the hydrophilicity of the completed membrane.

The modified polymer blended with PVP was dissolved in a mixture containing N-methyl pyrrolidone and sulfolane. A suitable pore former, such as ethylene glycol or lithium chloride, both well known to those skilled in the art, was added in a quantity to present a concentration of from 1 to about 10 % (w/w) of the pore former in the final product. The amount of pore former added was determined by the degree of porosity desired in the final product. The admixture was thoroughly blended and after degassing using conventional techniques was cast on a substrate such as a nonwoven fabric. A doctor blade was employed to disperse the casting in a uniform manner at a thickness of approximately 10 mils. The smoothed product was immediately gelled by immersion in a bath of cold water and N-methyl pyrrolidone [NMP being present from 0-70% (v/v)] for 15 seconds followed by continuous water washing for approximately 24 hours to remove all extraneous extractable contaminates.

Chlorine resistance of a membrane prepared according to Example 1 was assessed by soaking samples in a chlorine bath and then removing the samples, folding same and applying 30 p.s.i. The procedure was repeated with the samples being examined under a microscope to determine the presence of cracks. The results are summarized in Table 1 following:

TABLE I

| Membrane Polymer Material | Time of Exposure (hours) | No. of Folds at 30 psi until crack |
|---|---|---|
| Polyether sulfone[1] | 4 | >20 |
| Polyether sulfone[1] | 6 | 4 |
| Polyether sulfone[2] | 4 | >20 |
| Polyether sulfone[2] | 5 | 4 |
| Unmodified Polyether sulfone[3] | 1 | 1 | note:
[1]prepared according to Example 1. Test sample had MN = 94,600, WF = 7.67%. Blended with PVP having MN = 150,000 and MW = 612,000
[2]prepared according to Example 1. Test sample had MN = 94,600, WF = 7.65%. Blended with PVP having MN = 271,000, MW = 906,000
[3]MN = 47,000, WF = 30%

Efficiency of the membrane prepared according to the Example 1 was assessed both before and after chlorine exposure. Samples were placed in a cross flow flat test cell unit and tested for water and 8% whey flux at 40 degrees Celsius. Whey permeate was analyzed for protein using tricholoroacetic acid turbidity test and percent rejection of whey protein by each membrane was calculated. The results are summarized in Table 2.

TABLE 2

MEMBRANE FILTRATION EFFICIENCY--EXAMPLE 1 POLYMERS

| Membrane Polymer Material | Water Flux (gal/ft$^2$-day) | Whey Flux (gal/ft$^2$-day) | Whey Protein Rejection (%) |
|---|---|---|---|
| Polyether sulfone[1] | 167 | 29 | 99.98 |
| Unmodified Polyether sulfone[2] | 305 | 30 | 99.93 | note:
[1]see note 1, table 1
[2]see note 3, table 1

EXAMPLE 2

300g. of polyether sulfone resin (MN=45,000; MW=107,000 and WF=30.4%) was dissolved in 1.2 liters of N-methyl pyrrolidone (NMP) and then mixed in a blender. The mixture was then diluted with 1.9 liters of 80% (v/v) NMP in water followed by two solvent precipitations as set forth in Example 1. The precipitate was then dissolved in 750 ml of NMP (per example 1) followed by adding dropwise to water to precipitate the final product. The precipitate was washed with water to remove any NMP and then dried for 24 hours at 150 degrees Celsius.

The modified polymer had an MN=59,800 an MW=129,000 and a WF=17%. The modified polymer was blended with 5% (w/w) polyvinylpyrrolidone (per example 1) having an MN=150,000 and a MW=612,000 and then cast and hardened in the manner discussed in Example 1 to present a usable membrane.

Chlorine resistance of membrane prepared according to Example 2 was assessed by soaking samples in a chlorine bath and then removing the samples, folding same and applying 30 p.s.i. pressure. The procedure was repeated with the samples being examined under a microscope to determine the presence of cracks. The results are summarized in Table 3 following:

TABLE 3

DEGREE OF CHLORINE ATTACK VERSUS MEMBRANE EMBRITTLEMENT--EXAMPLE 3 POLYMERS

| Membrane Polymer Material | Time of Exposure (hours) | No. of Folds 30 psi until crack |
|---|---|---|
| Polyether sulfone[1] | 4 | >20 |
| Polyether sulfone[1] | 5 | 18 |
| Unmodified Polyether sulfone[2] | 1 | 1 | note:
[1]Prepared according to Ex. 2. Test sample had MN = 59,800, MW = 129,000 and WF = 17%. Blended with PVP having MN = 150,000 and MW = 612,000.
[2]see note 3, table 1

EXAMPLE 3

In this example, 300 g of polyether sulfone resin having an MN=45,000, an MW=107,000 and a WF=30.4% was dissolved in 1.2 l of N-methyl pyrrolidone. Four solvent precipitations were carried out according to the procedure set forth in Example 1. The final product had an MN=94,600, an MW=161,000 and a WF=11.5%.

The modified polymer was blended with 5% (w/w) of one of two polyethyl oxazolines. The first had an MN=33,000 and an MW=72,000. The second had an MN=159,000 and an MW=370,000. The polymers were combined with a suitable pore former and cast according to the procedure previously described.

Chlorine resistance of membranes prepared according to Example 3 was assessed by soaking samples in a chlorine bath and then removing the samples, folding same and applying 30 p.s.i. The procedure was repeated with the samples being examined under a microscope to determine the presence of cracks. The results are summarized in Table 4 following:

TABLE 4

DEGREE OF CHLORINE ATTACK VERSUS MEMBRANE EMBRITTLEMENT--EXAMPLE 3 POLYMERS

| Membrane Polymer Material | Time of Exposure (hours) | No. of Folds 30 psi until crack |
|---|---|---|
| Polyether sulfone[1] | 3.5 | >20 |
| Polyether sulfone[1] | 5.0 | 10 |
| Polyether sulfone[2] | 5.0 | >20 |
| Polyether sulfone[2] | 7.0 | 10 |
| Polyether sulfone[3] | 4.0 | >20 |
| Polyether sulfone[3] | 5.0 | 6 |

TABLE 4-continued

DEGREE OF CHLORINE ATTACK VERSUS MEMBRANE EMBRITTLEMENT--EXAMPLE 3 POLYMERS

| Membrane Polymer Material | Time of Exposure (hours) | No. of Folds 30 psi until crack |
|---|---|---|
| Unmodified Polyether sulfone[4] | 1.0 | 2 | note:
[1]Prepared according to Example 3. Test sample had MN = 94,000, MW = 161,000 and WF = 11.15% Blended with 5% polyethyl oxazoline MN = 33,000 and MW = 72,000
[2]Prepared according to Example 3. Test sample had MN = 94,000, MW = 161,000 and WF = 11.15%. Blended with 5% polyethyl exazoline MN = 159000 and MW = 370000
[3]Polyether sulfone MN = 94,000, WF = 11.65% blended with PVP MN = 271,000, MW = 906,000
[4]Polyether sulfone MN = 45,000, MW = 107,000. WF = 30% blended with PVP MN = 271,000 and MW = 906,000

While the invention encompasses any condensation polymer that is capable of being formed into an ultrafiltration membrane, a preferred group of polymers is that consisting of polysulfone, polyether sulfone and polyarylsulfones such as poly(oxy-1,4-phenylene sulfonyl-1,4-phenyleneoxy-4,4'-biphenylene) and poly(oxy-1,4-phenylene sulfonyl-1,4-phenyleneoxy-4,4'-biphenyleneoxy-1,4-phenylene sulfonyl-1,4-phenyleneoxy-1,4-phenylene). The most preferred polymer for use in the present invention is polyether sulfone.

It is to be understood that the modified polymers according to the present invention may be formed into copolymers with other known membrane forming materials including copolymers of the named condensation polymers with each other and copolymers and mixtures of other unmodified polymers.

The membrane materials according to the invention may also incorporate other known membrane additives such hydrophilicity enhancers, e.g. hydrophilic urethane and polyoxazolines.

The hardened membrane material may be processed in a conventional matter to form the final membrane including the use of pore formers or to achieve the desired end product. Suitable pore formers include low molecular weight organic compounds, inorganic salts and organic polymers, for example vinyl pyrrolidone/dimethyl aminomethyl methacrylate; polyoxazolines such as poly(2-ethyl-I-oxazoline) and poly(2-methyl-2-oxazoline); copolymers of polysulfone such as polysulfone-b-polyethylene oxide and polysulfone-b-polyvinyl pyrrolidone; and copolymers of polyether sulfone such as polyether sulfone-b-polyethylene oxide and polyether sulfone-b-polyvinyl pyrrolidone.

Other suitable pore formers include low molecular weight organic acids such as acetic acid, propionic acid and sulfolane and inorganic salts such as lithium chloride, lithium bromide, lithium fluoride, sodium bicarbonate, sodium carbonate and sodium acetate. Organic polymers such as poly(N-vinyl pyrrolidone) and poly(ethylene glycol) may also be used as pore formers.

From the foregoing it will be seen that this invention is one well adapted to attain all ends and objects hereinabove set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

Having thus described the invention, I claim:

1. A material useful in preparing ultrafiltration membranes comprising:

polyether sulfone which has been modified to impart to it at least one of the following characteristics: (a) a number average molecular weight (MN) of at least 59,000 and (b) a maximum weight fractions (WF) of 19% of polyether sulfone molecules with a molecular weight of not more than 50,000.

2. A material as set forth in claim 1, wherein the MN for the polyether sulfone equals 59,000 to 183,000.

3. A material as set forth in claim 1, wherein said polyether sulfone has both said characteristics.

4. An ultrafiltration membrane comprising a porous structure and a backing support, said structure comprising:

polyether sulfone which has been modified to impart to it at least one of the following characteristics: (a) a number average molecular weight (MN) of at least 59,000 and (b) a maximum weight fractions (WF) of 19% of polyether sulfone molecules with a molecular weight of not more than 50,000.

5. An ultrafiltration membrane as set forth in claim 4, wherein the MN of polyether sulfone equals 59,000 to 183,000.

6. An ultrafiltration membrane as set forth in claim 5, wherein said polyether sulfone has both said characteristics.

7. An ultrafiltration membrane comprising a porous structure and a backing support, said structure comprising:

at least one condensation polymer having both of the following characteristics: (a) a number average molecular weight (MN) for the condensation polymer of at least 59,000 and (b) a maximum weight fractions (WF) of 19% of the condensation polymer molecules with a molecular weight of not more than 50,000.

8. An ultrafiltration membrane as set forth in claim 7, wherein the MN of the condensation polymer equals 59,000 to 183,000.

9. An ultrafiltration membrane as set forth in claim 7, wherein said condensation polymer is polyether sulfone.

10. An ultrafiltration membrane as set forth in claim 9, wherein the MN of the condensation polymer equals 59,000 to 183,000.

11. An ultrafiltration membrane as set forth in claim 7, wherein said condensation polymer is a member of the group consisting of polysulfone, polyether sulfone and polyarylether sulfones.

* * * * *